2,985,626

HIGH MELTING COPOLYAMIDES FROM OMEGA-AMINOCARBOXYLIC ACIDS, TEREPHTHALIC ACID AND 1,4-CYCLOHEXANEBIS(METHYL-AMINE)

John R. Caldwell and Russell Gilkey, Kingsport, Tenn., assignors to Eastman Kodak Company, Rochester, N.Y., a corporation of New Jersey No Drawing. Filed Jan. 24, 1957, Ser. No. 635,957

13 Claims. (Cl. 260—78)

This invention relates to improved linear highly polymeric fiber-forming copolyamides formed by the condensation of from 1 to 3 isomers of an aliphatic bifunctional omega-amino carboxylic compound containing from 5 to 12 carbon atoms (e.g. 6-amino caproic acid or the corresponding lactam, namely, epsilon caprolactam) which is co-condensed with terephthalic acid and a bifunctional diamine selected from the group consisting of para-xylene-$\alpha,\alpha'$-diamine and 1,4-cyclohexane bis(methylamine) which includes the cis or the trans isomers or mixtures thereof. The preferred copolyamides of this invention contain from 55 to about 80 mole percent of the omega-amino carboxylic compound.

This invention provides an up-grading of the polyamides of the class formed from an omega-amino carboxylic compound. Of this class of polymers 6-nylon also called Perlon L is now commercially available; it softens at about 195–200° C. and melts at about 205° to 215° C. As a result of the up-grading of such a polyamide according to this invention, novel copolyamides are formed which have melting points of from about 220° C. up to about 300° C. and can be formed into clear films and molded objects, can be extruded to form excellent fibers, and are generally useful for any of the purposes for which 6-nylon or nylon 66 is known to be useful.

In contrast to 6-nylon or nylon 66, these novel copolyamides have improved dyeability, broader softening temperature range, higher tensile modulus, and other improved physical and chemical characteristics.

In this specification omega-aminocarboxylic acids and corresponding lactams are generically referred to as omega-aminocarboxylic compounds. The employment of a 6-aminocaproic compound in the formation of polyamides such as Perlon L or 6-nylon on a commercial scale has been only partially successful since there are many instances where a higher melting point is desirable. For general textile use, it is important to have a melting point that is about 240° C. or higher and a softening temperature of at least about 220° C. Nylon 66 has a softening temperature around 220° C. and a melting point of about 265° C.

The prior art discloses various copolyamides formed from various components including 6-aminocaproic acid or its lactam which have been characterized by even lower melting points and softening temperatures, hence they are obviously not of commercial promise for general textile use. For example, a copolyamide from 6-aminocaproic acid, adipic acid, and hexamethylenediamine has been prepared and found to have melting points well below those of 6-nylon. Thus, the presence of 30–40% of adipic acid and hexamethylenediamine in this copolyamide depressed the melting point to about 170° C. A similar result was obtained with a copolymer of 6-aminocaproic acid plus hexamethylenediamine and terephthalic acid. For example, the presence of 20–30% of the terephthalic acid-hexamethylenediamine component also depressed the melting point to about 200° C. These results are in accordance with the widely accepted rule developed by Flory which states that interpolymers melt lower than the pure homopolymer, that is, if component A was added during the formation of polymer B, the melting point of polymer B would be depressed according to the molecular proportion of A. This rule is discussed at considerable length by Flory in J. Am. Chem. Soc. 72 2024 (1950). See also J. Chem. Phys. 17 223 (1949). The theoretical derivation is given for this rule along with considerable experimental verification. This melting point rule has been widely accepted in the field of polymer science and it is often called "Flory's Melting Point Law." The general validity of this rule has been established for polyesters, polyamides and vinyl polymers. The polyamides of this invention represent an unexpected exception to Flory's rule and thereby add an important contribution to the art which also has considerable economic value because the polyamides of 6-aminocaproic compounds and related compounds can be up-graded and their utility thereby greatly increased.

Various modifiers of polycaproamide polymers, along with the melting point of the resulting copolyamide (homopolyamide melts at about 210° C.) are given below in order to illustrate a few examples of this invention in tabular form:

| Mole percent 6-amino-hexanoic acid | Melting Point of Copolyamides, ° C. | |
|---|---|---|
| | Modified with terephthalic+1,4-cyclohexane-bis-(methylamine) | Modified with terephthalic+p-xylene-$\alpha,\alpha'$-diamine |
| 85 | 220–230 | |
| 75 | 240–250 | 255–270 |
| 67 | 295–310 | 275–290 |

Calculations based on data in Faserforschung and Textiltechnik, 6, 277 (1955) show that the employment of terephthalic acid+hexamethylenediamine as a modifier is not capable of producing the advantageous results achieved according to the present invention although fairly substantial proportions of terephthalic acid+hexamethylenediamine will apparently raise the melting point; however, 15% modifier with 85% polymerized 6-aminohexanoic acid melts at only 170° and the 25%–75% copolyamide melts at only 200° C. (10 degrees less than the homopolyamide).

The above table shows the comparison between the copolyamides of this invention and those which are modified with terephthalic acid plus hexamethylenediamine. In each instance, the copolyamides of this invention have melting points which are 35–70° higher than those cited for purposes of comparison. This is most unexpected for the reasons discussed hereinabove.

It is an object of this invention to provide a linear highly polymeric fiber-forming copolyamide derived for the most part from the condensation of an omega-aminocarboxylic compound with an up-grading component whereby the copolyamides have higher melting points than the homopolyamides derived from the omega-aminocarboxylic compound.

An additional object of this invention is to provide a process for preparing copolyamides of an omega-aminocarboxylic compound wherein the process for preparing a homopolyamide is modified by incorporating a substantial proportion of an up-grading dicarboxy compound and an up-grading diamine.

A particularly valuable object of this invention pertains to the up-grading of those polyamides derived from branched chain omega-aminocarboxylic compounds.

A further object of this invention is to provide fibers, films, molded objects, compositions, and other materials of improved utility.

Additional objects will become apparent hereinafter.

According to a principal embodiment of this invention we have found that the class of linear highly polymeric fiber-forming polymers formed by the condensation of an aliphatic bifunctional omega-aminocarboxylic compound containing from 5 to 12 carbon atoms, can be greatly improved by having incorporated into this class of polymers from about 15 to 20 up to about 35 to 50 mole percent of polyamide components derived from terephthalic acid and a bifunctional diamine selected from the group consisting of p-xylene-$\alpha,\alpha'$-diamine, trans-1,4-cyclohexane bis(methylamine) and cis-1,4-cyclohexane bis(methylamine).

These up-graded polyamides can be advantageously produced by a process which comprises condensing 6-aminocaproic acid or the lactam thereof or the indicated homologs thereof containing from 5 to 12 carbon atoms, with terephthalic acid and an equimolecular proportion of a bifunctional diamine selected from the group just described. Alternatively, a salt can be formed from the terephthalic acid and one of the bifunctional diamines just described and this salt heated with 6-aminocaproic acid or its lactam or homolog thereof so as to form the copolyamide in accordance with this invention. Other processes can also be employed.

The techniques which can be employed for the preparation of such copolyamides are known in the art and need no detailed elaboration in this specification. Some of the techniques which can be employed are illustrated in the various examples which are set forth hereinbelow.

Valuable copolyamides can be produced in accordance with this invention which give clear films and molded objects, have melting points of 230° C. or higher, have excellent dyeability, soften over a broad range of temperatures as wide as from 10° to 20°, and possess essentially all of the valuable characteristics otherwise possessed by homopolyamides formed from 6-aminocaproic acid, its lactam or homologs thereof; thus, fibers made from the upgraded polymers of this invention have excellent physical properties such as tensile strength, elongation, elasticity, etc.

One of the most noticeable improvements which the 6-aminocaproic copolyamides of this invention have in contrast to the homopolyamides of 6-aminocaproic acid or its lactam is based upon the fact that the homopolyamide has a strong tendency to crystallize and become opaque when molded or pressed into sheets, whereas the upgraded copolyamides possess the opposite tendency toward giving clear films and molded objects.

It is most unobvious that the products of this invention have such excellent physical and chemical characteristics in contrast to those of the homopolyamide. The copolyamides wherein the bifunctional amine is p-xylene-$\alpha,\alpha'$-diamine or trans-1,4-cyclohexanebis(methylamine) are polymers or exceptional value and can be considered in a class by themselves having melting points in the range of about 250° C. or higher. As a practical matter, it is generally advantageous to employ mixtures of the trans and cis isomers. Hence, the examples given throughout this specification are based upon the employment of such mixtures rather than only one of the isomers of 1,4-cyclohexanebis(methylamine). The name 1,4-cyclohexanebis(methylamine) is the name preferred by Chemical Abstracts Nomenclature. This compound can also be called 1,4-di-(aminomethyl)cyclohexane.

An advantageous method for preparing the copolyamides of this invention includes heating the reactants at a temperature of from about 200° to about 300° C. for several hours. Advantageously, the first stage of the heating cycle can be carried out under pressure in order avoid the escape of volatile reactants. Thus, the first stage is preferably carried out in a closed vessel such as an autoclave. The final stage of the polymerization can be advantageously performed at atmospheric pressure in an inert atmosphere or under a vacuum. Although the processes for preparing the copolyamides of this invention can be conducted employing the free acid, it is frequently advantageous to employ the lactam. In accordance with a preferred embodiment of this invention, a salt is first prepared from equimolecular quantities of one of the designated bifunctional diamines and terephthalic acid. This salt is then advantageously heated with the acid or lactam in the desired ratio.

In general, any omega-amino acid that contains from 5 to 10 carbon atoms between the carboxyl group and amino group can be used. The carbon chain can be straight or branched. Examples of straight chain amino acids are given by the general structure

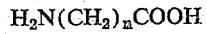

$$H_2N(CH_2)_n COOH$$

where $n=5-10$. The branched chain acids can contain methyl or ethyl groups as substituents on the main carbon chain. The methyl- and ethyl-substituted 6-aminocaproic acids are of particular importance because they are derived from low-cost cresols, xylenols, and ethylphenol fractions that are obtained in coal tar and coal hydrogenation products. Heretofore, the amino acids made from the alkylated phenols were of no value because the side chains lowered the melting point of the polyamides excessively.

An important object of this invention is to provide a method for up-grading the polyamides made from branched chain amino acids to give valuable products that melt in the range required for textile fibers and high-melting plastics. Although amino acids containing methyl or ethyl groups are of value in the process of the invention, higher alkyl groups such as propyl, isobutyl, and butyl can be present. Suitable examples of branched chain amino acids include: 6-aminocaproic acid having a methyl or ethyl group in the 2,3,4, or 5 position; 7-aminoheptanoic acid having a methyl or ethyl group on any carbon except the seventh; higher amino acids are represented by 4-ethyl-10-aminodecanoic acid, 6-methyl-11-aminoundecanoic acid, etc.; if two substituents are present, it is preferred but not essential that they be located on the same carbon atom in order to give a symmetrical structure as represented by 3,3-dimethyl-6-aminocaproic acid and 4,4-dimethyl-7-aminoheptanoic acid. The omega carbon atom preferably contains no additional alkyl substituent.

Although it is preferred to use only one amino acid in the copolyamides of the present invention, in some cases a mixture of two or three amino acids can be employed. For example, satisfactory results can be obtained by using the mixture of methyl-substituted 6-aminocaproic acids made from commercial "cresylic acid" which is a mixture of o-, m-, and p-cresol. The principal components are 3- and 4-methyl-6-aminocaproic acids.

This invention can be further illustrated by the following examples of preferred embodiments although it will be understood that these examples are included merely for purposes of illustration and are not intended to limit the scope of the invention unless otherwise specifically indicated.

*Example 1*

The salt of terephthalic acid and 1,4-cyclohexanebis (methylamine) is especially valuable for modifying 6-aminohexanoic acid polyamides. From 25 to 33 mole percent of this component gives copolyamides that melt in the range of 240–310° C. This high melting point is particularly surprising since it is shown in the prior art that 25 mole percent of terephthalic acid-hexamethylenediamine salt actually lowers the melting point.

A mixture of 0.75 molecular proportion of 6-aminohexanoic acid lactam (caprolactam) and 0.25 molecular proportion of the salt of terephthalic acid and 1,4-cyclohexanebis(methylamine) was placed in a stainless steel autoclave. The salt was added as a 40% solution in water. The autoclave was purged with nitrogen and further purged of air by heating to 120° C. and releasing a small amount of water vapor. The release valve was then closed and the autoclave was heated to 260° C. while maintaining a pressure of 220-250 p.s.i. by releasing steam. The pressure was then slowly bled to atmospheric and heating at 260° was continued for two hours. The resulting colorless polyamide was extruded from the autoclave by nitrogen pressure. The inherent viscosity of the polymer, as measured in 60 phenol/40 tetrachlorethane was 0.85. The melting point, as measured under crossed nicols on the hot stage of a microscope was 240-250° C.

Using the general method described above, other ratios of the terephthalic acid salt of 1,4-cyclohexanebis(methylamine) were used. The melting points of the polymers are summarized below.

| Mole percent 6-aminohexanoic acid | M.P. of copolyamide, ° C. |
| --- | --- |
| 100 (M.P. 210°) | |
| 85 | 220-230 |
| 75 | 240-250 |
| 67 | 295-310 |

It is seen that the presence of the terephthalic acid salt raises the melting point substantially.

These copolyamides are moderately crystalline and can be spun into fibers which can be cold drawn and heat set under appropriate conditions. The fibers are readily dyeable with disperse dyes. The copolyamides are also valuable as molding materials. The relatively wide melting point range increases the ease of processing in extrusion. Clear, transparent molded articles are obtained due to the slower rate of crystallization of the copolyamide.

*Example 2*

The p-xylene-α,α'-diamine salt of terephthalic acid was used to modify poly-6-aminohexanoic acid and thus produce a series of high melting copolyamides. Polymers containing 25 and 33 mole percent of the terephthalic acid salt melted at 255-270° and 275-290° C., respectively.

*Example 3*

The polyamide made from 7-aminoheptanoic acid melts at 225° C. which is somewhat low for the manufacture of textile fibers. According to the process of the invention, copolyamides having a substantially higher melting point can be obtained, as shown below:

(a) A copolyamide made from 0.60 mole of 7-aminoheptanoic acid, 0.40 mole terephthalic acid, and 0.40 mole 1,4-cyclohexanebis(methylamine) melted at 260-275° C.

(b) A copolyamide made from 0.55 mole 7-aminoheptanoic acid, 0.45 mole terephthalic acid, and 0.45 mole p-xylene-α,α'-diamine melted at 275-290° C.

*Example 4*

The polyamide made from 4,4-dimethyl-7-aminoheptanoic acid is difficult to crystallize and melts in the range of 135-155° C. A copolyamide made from 0.55 mole 4,4-dimethyl-7-aminoheptanoic acid, 0.45 mole terephthalic acid, and 0.45 mole 1,4-cyclohexanebis (methylamine) melted at 245-260° C.

*Example 5*

The polyamide from 4-methyl-6-aminohexanoic acid melts in the range of 170-185° C. A copolyamide made from 0.60 mole 4-methyl-6-aminohexanoic acid, 0.40 mole terephthalic acid, and 0.40 mole p-xylene-α,α'-diamine melted at 250-265° C. Similar results can be obtained employing a mixture of isomers of methyl-6-aminohexanoic acid using either p-xylene-α,α'-diamine or 1,4-cyclohexane bis(methylamine). The principal isomers employed are those where the methyl radical is in the 3-position and 4-position.

All of the copolyamides described above can be made into fibers and films which can be oriented and heat set to form valuable materials for general textile use and many other purposes such as wrapping materials, electrical insulation, etc. Moreover, useful molding and extrusion plastics are also provided by this invention and are superior to those obtained from 6-nylon and nylon 66 in several important respects especially at elevated temperatures and during processing operations where a broad softening range is desirable. The production of crystal clear products of advantageously high melting points is especially noteworthy. Transparent films can be produced which can be readily dyed.

Reference is made to copending applications filed by Bell et al. October 24, 1956, Serial No. 617,931, and filed concurrently herewith by Caldwell et al. Serial Nos. 635,958 and 635,959 which describe related improved polyamides.

Although the invention has been described in considerable detail with reference to certain embodiments thereof, it will be understood that variations and modifications can be effected without departing from the spirit and scope of the invention as described hereinabove and as defined in the appended claims.

We claim:

1. A linear highly polymeric copolyamide having a melting point of from about 220° to about 300° C. of from 85 to 50 mole proportions of an aliphatic bifunctional omega-aminocarboxylic acid containing from 5 to 12 carbon atoms, from 15 to 50 mole proportions of terephthalic acid and a corresponding number of mole proportions substantially equal to the mole proportions of terephthalic acid of a bifunctional diamine selected from the group consisting of trans-1,4-cyclohexanebis-(methylamine) and cis-1,4-cyclohexanebis(methylamine).

2. A copolyamide as defined by claim 1 of from 85 to 50 mole proportions of 6-aminocaproic acid, from 15 to 50 mole proportions of terephthalic acid and an equimolecular proportion of trans 1,4-cyclohexanebis-(methylamine).

3. A copolyamide as defined by claim 1 of from 85 to 50 mole proportions of 7-aminoheptanoic acid, from 15 to 50 mole proportions of terephthalic acid and an equimolecular proportion of a mixture of trans and cis 1,4-cyclohexanebis(methylamine).

4. A copolyamide as defined by claim 1 of from 85 to 50 mole proportions of aminoheptanoic acid, from 15 to 50 mole proportions of terephthalic acid and an equimolecular proportion of 1,4-cyclohexanebis(methylamine).

5. A copolyamide as defined by claim 3 of about 3 mole proportions of 6-aminohexanoic acid, 1 mole proportion of terephthalic acid and 1 mole proportion of mixed cis and trans isomers of 1,4-cyclohexanebis (methylamine), characterized by melting at about 240°-250° C.

6. A copolyamide as defined by claim 3 of about 2 to about 4 mole proportions of 6-aminohexanoic acid, 1 mole proportion of terephthalic acid and 1 mole proportion of mixed cis and trans isomers of 1,4-cyclohexanebis (methylamine) characterized by melting at about 230°-300° C.

7. A process for preparing a linear highly polymeric copolyamide comprising heating from about 15 to about 50 mole proportions of terephthalic acid, from about 85 to 50 mole proportions of an omega-aminocarboxylic compound containing from 5 to 12 carbon atoms selected from the group consisting of lactams and aminoacids and from about 15 to about 50 mole proportions of a bifunctional diamine selected from the group consisting of trans-1,4-cyclohexanebis(methylamine) and cis-1,4-cyclohexanebis(methylamine) whereby there is formed a copolyamide melting at above 220° C.

8. A film of a copolyamide as defined in claim 1.
9. A fiber of a copolyamide as defined in claim 1.
10. A film of a copolyamide as defined in claim 3.
11. A fiber of a copolyamide as defined in claim 3.
12. A film of a copolyamide as defined in claim 4.
13. A fiber of a copolyamide as defined in claim 4.

References Cited in the file of this patent

UNITED STATES PATENTS

| | | |
|---|---|---|
| 2,130,523 | Carothers | Sept. 20, 1938 |
| 2,130,948 | Carothers | Sept. 20, 1938 |
| 2,241,321 | Schlack | May 6, 1941 |
| 2,252,555 | Carothers | Aug. 12, 1941 |
| 2,625,536 | Kirby | Jan. 13, 1953 |

FOREIGN PATENTS

| | | |
|---|---|---|
| 873,983 | France | Apr. 13, 1942 |
| 1,112,203 | France | Nov. 9, 1955 |

OTHER REFERENCES

Hill et al.: J. Polymer Science, vol. 3, 1948, pp. 609, 619–621.

Edgar et al.: J. Polymer Science, vol. 8, 1952, pp. 1, 16, 17.

Evans et al.: J. Amer. Chem. Soc., vol. 72, 1950, pp. 2018–2028.

UNITED STATES PATENT OFFICE
CERTIFICATE OF CORRECTION

Patent No. 2,985,626            May 23, 1961

John R. Caldwell et al.

It is hereby certified that error appears in the above numbered patent requiring correction and that the said Letters Patent should read as corrected below.

Column 6, line 45, for "7-aminoheptanoic" read -- 6-aminocaproic --; line 50, for "aminoheptanoic" read -- 7-aminoheptanoic --.

Signed and sealed this 31st day of October 1961.

(SEAL)

Attest:

ERNEST W. SWIDER            DAVID L. LADD
Attesting Officer            Commissioner of Patents

USCOMM-DC